Patented July 20, 1943

2,324,594

UNITED STATES PATENT OFFICE 2,324,594

SOLVENT EXTRACTION PROCESS

Herbert S. Polin, New York, N. Y.

No Drawing. Application May 10, 1941,
Serial No. 392,935

2 Claims. (Cl. 99—70)

This invention relates to improvements in solvent extraction processes.

One object of the invention is to provide an economical method for solvent extraction of relatively valuable constituents present in small percentages in the raw material, and requiring relatively expensive solvents for purposes of extraction, such for example as the extraction of caffein from the coffee bean by the use of chloroform.

Another object is to provide a method of multiple solvent extraction for simultaneously extracting a number of constituents from the raw material by selective action of the solvents.

Caffein is present in the coffee bean in small percentage, namely, about 1% of the total weight. Although chloroform is one of the best solvents for extracting caffein, it is relatively expensive and if used alone for extraction would entail undue expense owing to the large amount of the solvent required for extraction as well as for wetting the raw material, with consequent loss of solvent, expense of total solvent required, etc.

To overcome these disadvantages, it is proposed, in accordance with one aspect of the present invention, to dilute the chloroform with a much larger volume of an appropriate and relatively less expensive diluent, such as gasoline, petroleum ether, etc., whereby the initial wetting and absorption of the raw material is effected principally by the less expensive diluent, thus greatly reducing the amount of the chloroform solvent required, as well as reducing the ultimate losses thereof. The invention accordingly provides a process of solvent extraction in which a mixture of liquids are employed, at least one of which serves as a fairly cheap diluent for a selected solvent.

In the solvent extraction of the coffee bean, it is ordinarily desired to remove not only the caffein, but also the oily constituents present, and for such purposes, the employment of chloroform diluted with a relatively large volume of gasoline, petroleum ether or the like, is particularly advantageous because the gasoline, petroleum ether, etc., especially present in relatively large amount, has a selective action as regards extraction of the oily constituents, and will serve to extract the same almost completely, whereby practically all of the chloroform becomes available for extracting the caffein. Chloroform is a solvent for both the oily constituents as well as the caffein, so that if used alone as the solvent, its action in dissolving the oily constituents would reduce, to that extent, its solvent capacity for the caffein present. The use, therefore, in conjunction with chloroform of a relatively large volume of gasoline, petroleum ether, etc., the latter for extracting the oily constituents, serves in effect to increase the effectiveness of the chloroform in dissolving the caffein.

The invention, therefore, provides a process for multiple solvent extraction wherein a mixture of solvents are employed for simultaneously extracting a number of constituents, the solvent being either inherently selective as to their solvent actions with respect to the individual constituents, or rendered selective by reason of the relative proportions of each employed, such for example as by using a large volume of one solvent as compared to another.

Caffein is soluble in chloroform to the extent of about 14% by weight. Accordingly, for extracting the caffein, the chloroform should be employed in approximately the inverse ratio of this percentage, namely, about 7 to 8 parts by weight of the chloroform to 1 part by weight of the caffein. Chloroform and gasoline, petroleum ether, etc., are completely miscible with each other and with the oily constituents present in the caffein. On the other hand, caffein is soluble in gasoline, petroleum ether, etc., only to the extent of about 1%. Therefore, a mixture of about 8 parts of chloroform and a large volume of gasoline, petroleum ether, etc., such for example as about 50 to 100 parts by weight, is a very effective solvent for simultaneously extracting the caffein and oily constituents.

Speaking more generally, where the principles of the invention are employed for simultaneous extraction of a number of constituents and by the use of a mixture of selective solvents in which the constituents have but limited solubilities, the proportion by weight of each solvent employed to that of the constituent to be extracted thereby, should preferably be in approximately the inverse ratio of the percentage solubility of the constituent to be extracted thereby. Thus, for example, if constituent A is present to the extent of about 3% and is soluble in its solvent to the extent of about 10%, about 30 parts by weight of the solvent should be used for each 100 parts by weight of the raw material. Similarly, if constituent B is present in the raw material to the extent of about 8% by weight and is soluble in its solvent to the extent of about 2%, about 400 parts by weight of this solvent should be employed for each 100 parts by weight of the raw material. Therefore, for simultaneous extraction of constituents A and B, about 30 parts by weight of the solvent for constituent A should be used in conjunction with about 400 parts by weight of the solvent for constituent B.

I claim:

1. Process for extracting caffein and the oily constituents from raw coffee material which comprises, extracting said material with a solvent mixture comprising a relatively small proportion of chloroform for dissolving the caffein, and a relatively large proportion of hydrocarbon solvent by which the greater part of said oily constituents are dissolved.

2. Process for extracting caffein and the oily constituents from raw coffee material which comprises, extracting said material with a solvent mixture comprising hydrocarbon solvent for the oily constituents and chloroform, in such relative proportions that the chloroform is largely available for extracting the caffein while the hydrocarbon solvent dissolves at least the greater part of the oily constituents.

HERBERT S. POLIN.